March 1, 1932.  J. S. THOMPSON  1,847,680
FRICTION BRAKE
Filed April 13, 1927  2 Sheets-Sheet 1

Inventor
James S. Thompson
By Wm. O. Belt Atty.

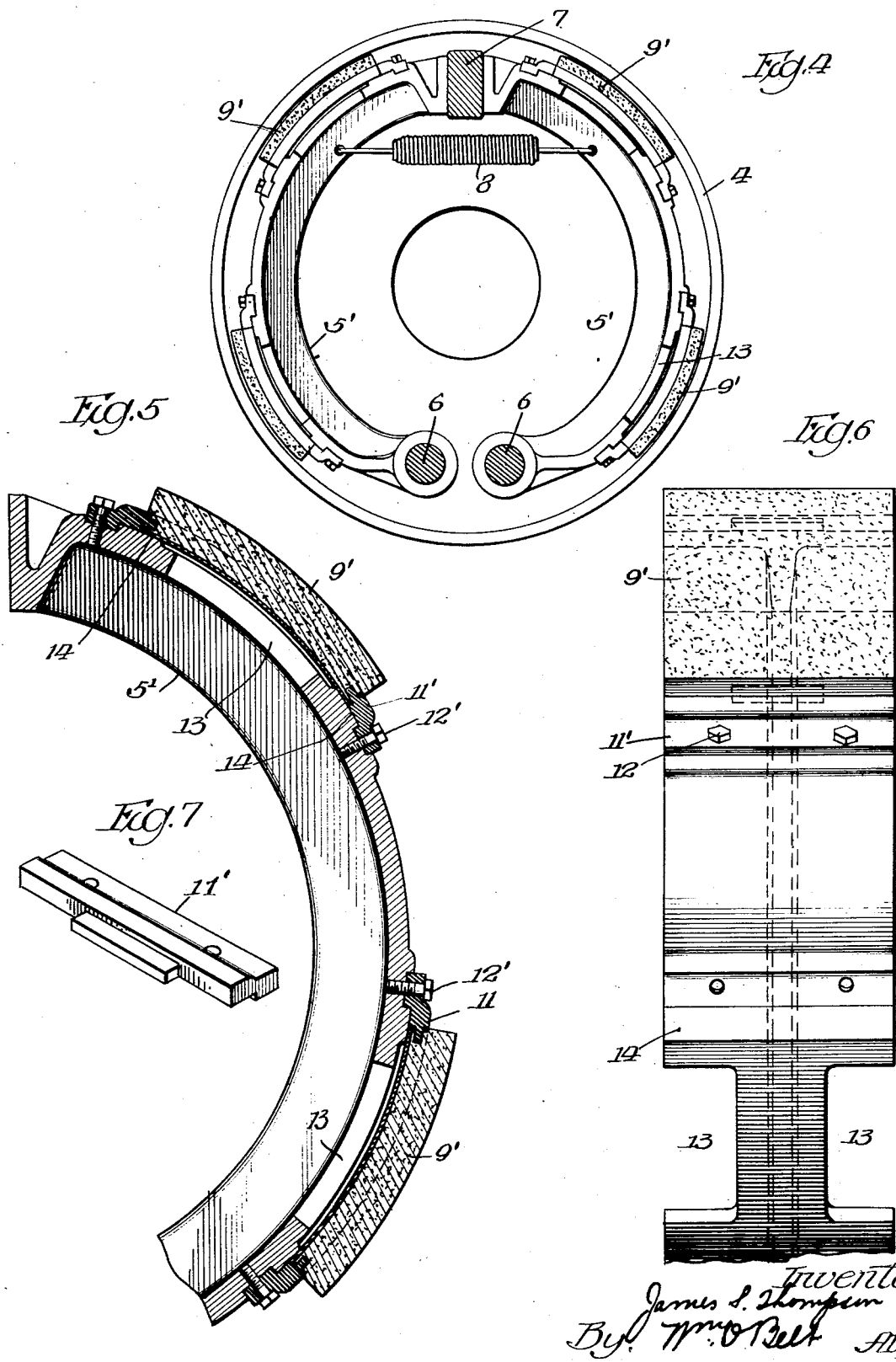

Patented Mar. 1, 1932

1,847,680

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed April 13, 1927. Serial No. 183,379.

This invention relates to friction brakes and while it is particularly adapted for expanding brakes arranged to make friction contact with a drum, which is a form of brake commonly employed in automotive vehicles, it is also useful in many other installations as will be apparent to those skilled in the art.

The object of the invention is to provide an internal expanding brake of novel construction and embodying a plurality of removable friction blocks or shoes suitably supported and spaced apart within a brake drum to make friction engagement with the rim of the drum without distorting the rim.

In the accompanying drawings illustrating selected embodiments of the invention, which I have found satisfactory in commercial tests;

Figs. 4, 5 and 6 are views similar to Figs. 1, 2 and 3 respectively, and showing another embodiment of the invention.

Fig. 7 is a detail perspective view of the form of clamp shown in Figs. 4-6.

Figure 1:
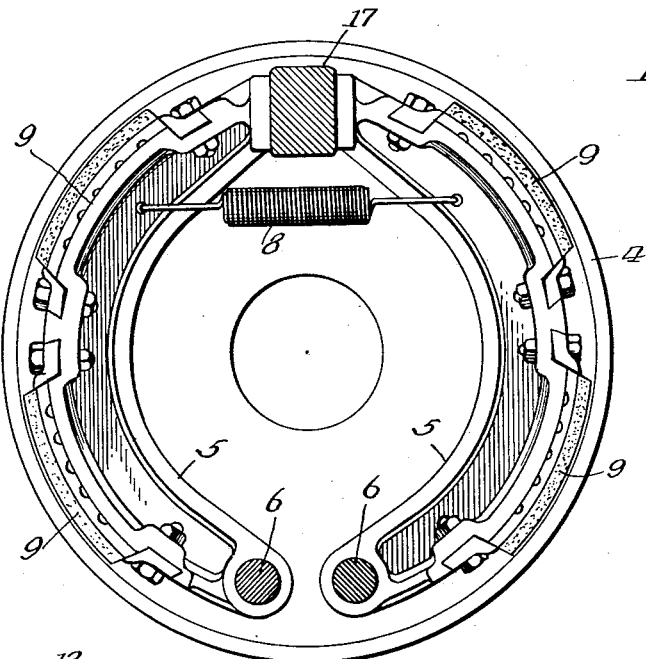
Fig. 1 is an elevation, partly in section, of parts of a brake assembly showing my invention applied thereto.
Figure 2:
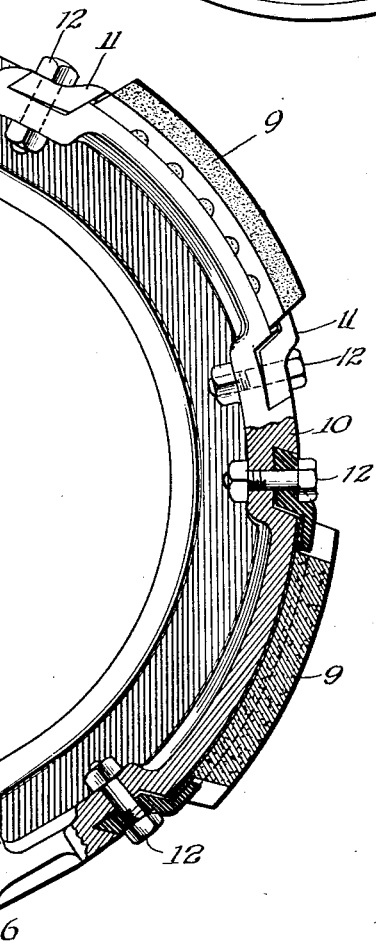
Fig. 2 is an enlarged elevation, partly in section, of one brake head.
Figure 3:
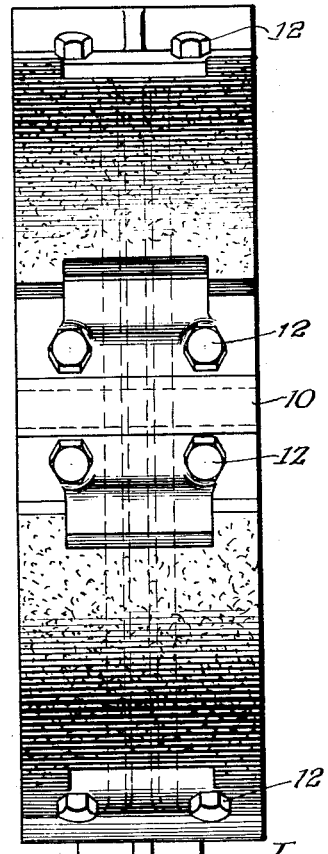
Fig. 3 is a plan view of the brake head shown in Fig. 2.

Referring to Figs. 1-3 of the drawings 4 is the brake drum, 5, 5 are the brake heads which are pivotally mounted on the studs 6, 6 and are adapted to be operated by the cam 7 and the spring 8 to move the friction blocks 9, 9 into and out of operative contact with the drum. The construction of the drum, the manner of mounting the brake heads and the mechanism for operating the brake heads form no part of this invention and it will be understood that the invention can be embodied in brake assemblies of different kinds.

The head comprises an arm substantially T-shaped in cross section and having a face plate 10 to form seats for the blocks. Two blocks are removably mounted on each head and for securing each block to the head I may employ clamps 11 which engage the ends of the block and are fastened to the head by bolts 12. These clamp devices are covered by my co-pending application Serial No. 105,897 filed May 1, 1926. In Figs. 4-7 I have shown a brake head 5' substantially similar to the brake head of Figs. 1-3 except that its face is provided with recesses 13 at the block seat and the block 9' is supported at its ends upon shoulders 14 so that the greater part of the back of the block is clear of the head to provide for circulation of air about the block to assist in dissipating the friction heat. The type of head and the block of Figs. 4-6 are covered by my co-pending application Serial No. 92,048 filed March 3, 1926 and the clamps 11' and fastening bolts 12' shown herein are also covered by said co-pending application. I may also use the type of block disclosed in my co-pending applications Serial No. 183,383 and Serial No. 183,384 filed April 13, 1927 instead of the blocks and their securing means shown herein.

The blocks shown herein and in the companion applications referred to are made with a composition body mounted upon a metal back, and my present invention may be embodied with these or any other suitable blocks for producing desired braking friction by contact with the rim of the drum. The blocks are preferably made interchangeable and the securing means are also preferably made interchangeable to facilitate the application and the use thereof.

In the automotive industry the friction means generally employed has been a fabric lining fastened to the head and adapted to be moved into frictional contact with the rim of the drum, but because of the extended area of this lining to obtain the desired braking friction no sufficient opportunity has been afforded for dissipation of the heat of friction produced under application of the brake. The result has been objectionable for many reasons and it has been found that this heat injuriously affects the rubber tires on the wheels. Metal plates or shoes have also been used to some extent, but it has been found that they score and otherwise damage the drums. It is the aim of my invention to reduce the friction contact area and dispose the friction blocks in a manner which will permit the friction heat to dissipate and also prevent liability of distortion of the rim of the drum. To this end I provide each head with two friction blocks which are spaced from the ends of the head and also from each other thereby allowing for the circulation of air between the head and the drum and about the blocks to assist in dissipating the friction heat. This spacing of the blocks on each head results in a disposition of the blocks within the rim at suitable intervals which avoids any liability of the rim of the drum being distorted under application of the brakes. In practice it is found that when the brake heads are equipped with blocks like or substantially like those shown herein or in my companion applications referred to there has been no distortion of the drums which I consider due to the fact that the blocks are spaced from the ends of the head and from each other. This is a desirable construction for such installations as might, under extreme conditions, result in a slight distortion of the drum if one block only were used on each head.

The blocks 9' of Figs. 4-6 are somewhat shorter than the blocks 9 of Figs. 1-3, and consequently the blocks 9' are spaced farther apart on each head than are the blocks 9; and also in the construction of Figs. 4-6 greater ventilation is afforded for the dissipation of the friction heat because of the skeleton construction of the head and the increased facility for circulation of air about the head and the blocks. The blocks on one head are preferably disposed opposite to those on the other head for my tests have disclosed this to be a desirable disposition of the blocks not only to produce the braking friction satisfactorily but also to avoid possibility of distorting the drum.

I have indicated herein the kind of friction blocks and the kind of means for securing the friction blocks upon suitable supporting heads in a brake assembly, but I do not desire to limit this invention to these details of construction and reserve the right to embody the invention in other structural forms within the scope of the following claim.

I claim:

The combination with a brake head embodying a convex arcuate face having a plurality of sets of recesses therein and an enlarged recess intermediate the recesses of each set, of a plurality of composition friction blocks mounted between the recesses of each set and disposed to extend over said enlarged recesses, said blocks being interchangeable with each other and reversible end for end, clamps disposed in the recesses of the sets, and means for tightly securing said clamps to said head to secure said blocks thereto.

JAMES S. THOMPSON.